Figure 1:
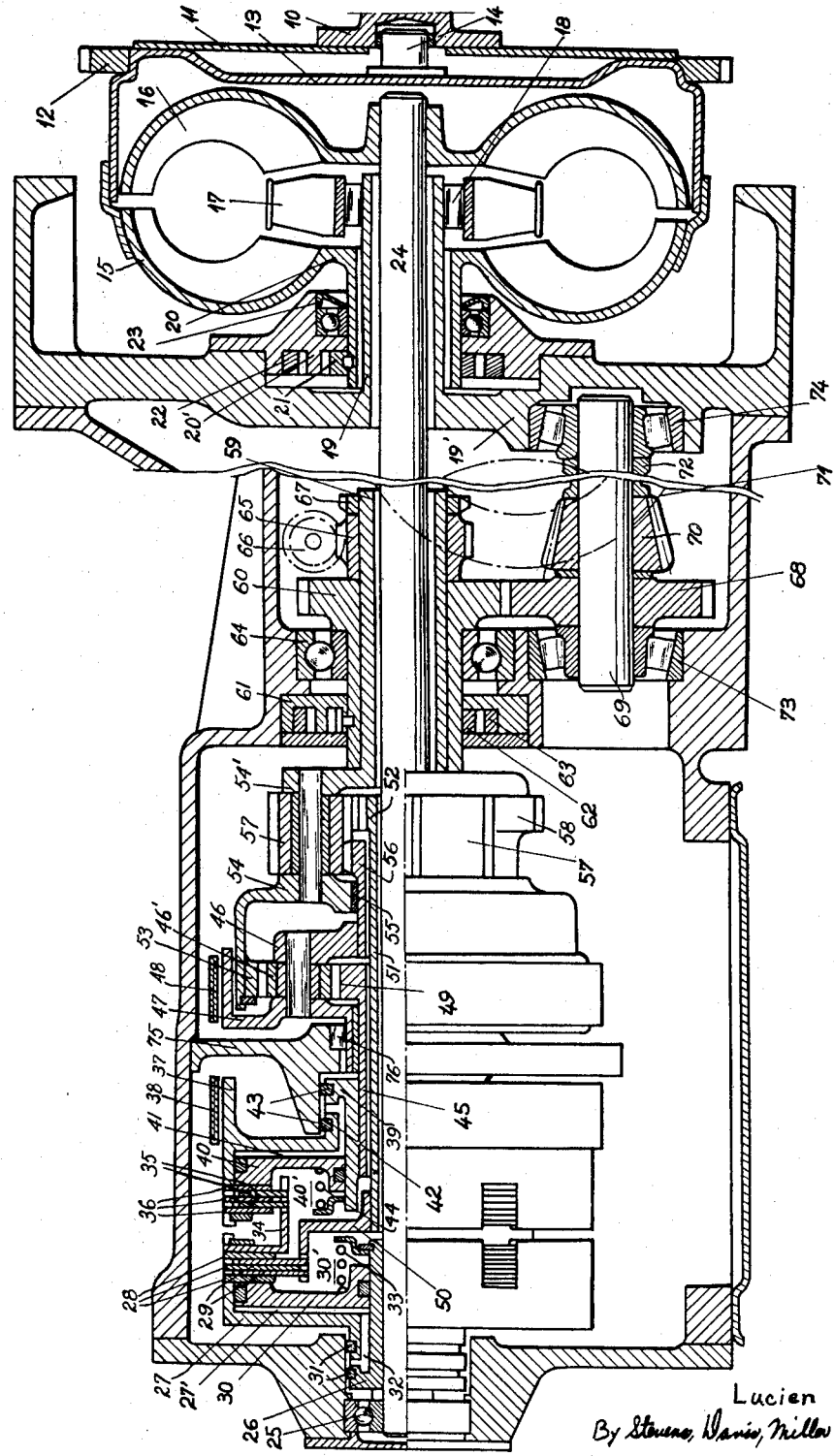

July 2, 1963

L. PÉRAS 3,095,764

CHANGE-SPEED GEARS FOR ENGINE AND
TRANSMISSION MECHANISM UNITS

Filed Jan. 10, 1961

2 Sheets-Sheet 1

Inventor
Lucien Péras
By Stevens, Davis, Miller & Mosher
Attorneys

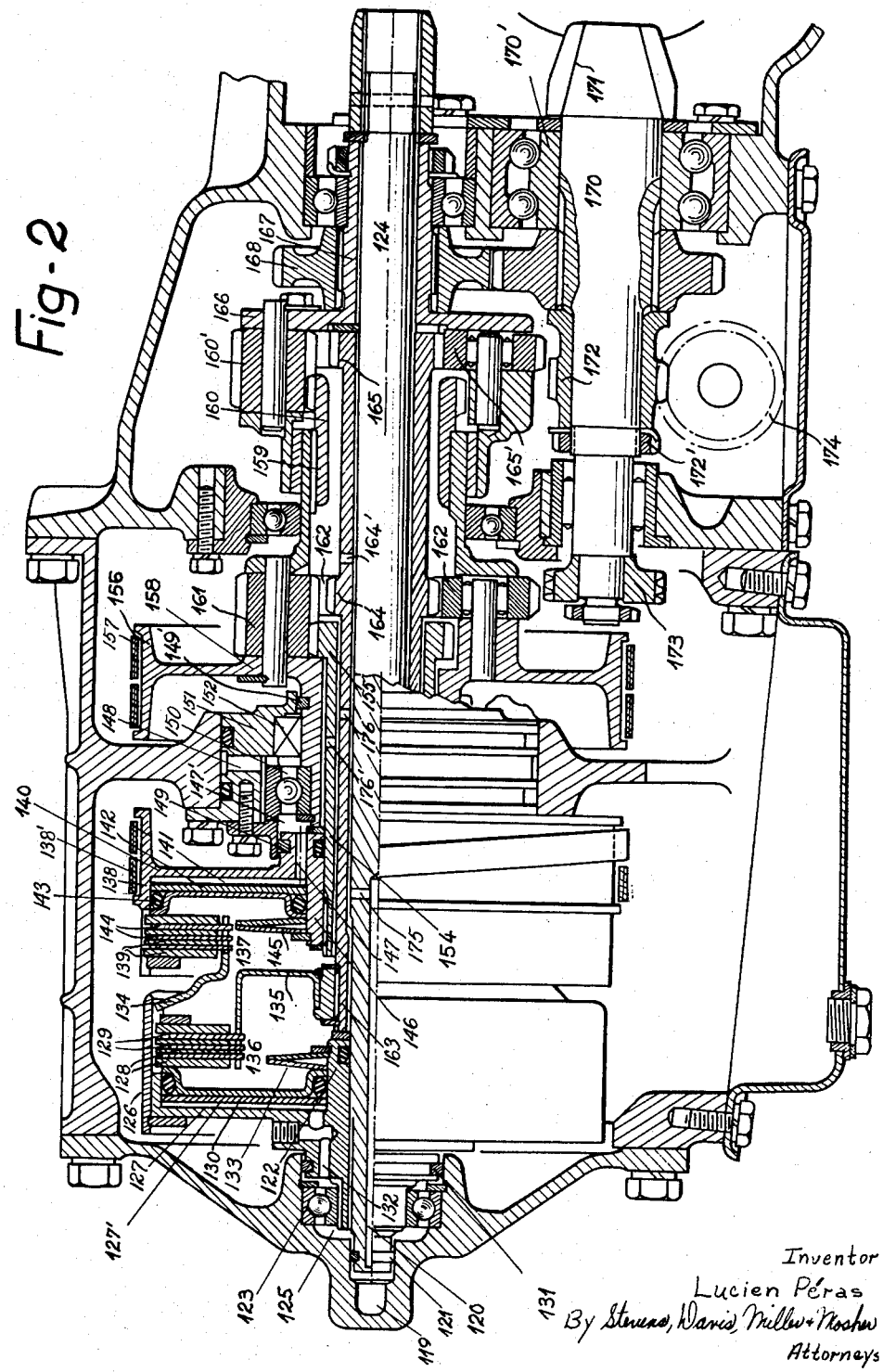

United States Patent Office 3,095,764
Patented July 2, 1963

3,095,764
CHANGE-SPEED GEARS FOR ENGINE AND TRANSMISSION MECHANISM UNITS
Lucien Péras, Billancourt, France, assignor to Regie Nationale des Usines Renault, Billancourt, France
Filed Jan. 10, 1961, Ser. No. 81,778
Claims priority, application France Jan. 15, 1960
4 Claims. (Cl. 74—763)

This invention relates to the combination, in a change-speed gear providing three forward speeds and reverse, of known means consisting of the coaxial arrangement of the input and output shafts, by using on the one hand, two clutches in parallel for connecting the input shaft with two elements of an epicyclic gear, and on the other hand a specific planet gear arrangement, with a view to solve the problem arising from the grouping into a single, unitary structure of the engine and change-speed gear on either side of the final reduction counter-gear and to the differential to constitute the engine and transmission unit.

The present invention consists, by connecting the engine to the change-speed gear through a single shaft of relatively moderate diameter that can easily be disposed in close vicinity of the differential casing, this shaft being driven from the engine through the medium of a clutch, a hydraulic coupler or preferably a hydraulic torque converter, in causing said shaft to extend throughout the change-speed gear, and mounting thereon, at its free end, the input clutches thus advantageously grouped into clutch units separate from the epicyclic gear mechanism proper.

This invention will now be described with reference to FIGS. 1 and 2 of the accompanying drawings showing diagrammatically in longitudinal axial section two typical forms of embodiment of the invention.

In FIG. 1 the engine output shaft 10 drives through the medium of a flange 11 the casing 13 of a torque converter. This casing 13 is welded on the impeller 15 and carries the starter gear ring 12 and a stub shaft 14 welded on the casing 13 coaxially to the engine shaft 10 for centering the torque converter. The impeller 15 has secured thereon a hub 20 adapted on the one hand to carry a shaft packing 23 and on the other hand to drive an oil pump 20' comprising gears 21 and 22. The reaction member 17 of the torque converter is connected to the case 19' through a freewheel 18 and a shaft 19. The turbine or driven member 16 of the converter drives in turn a shaft 24 constituting the input shaft of the transmission or change-speed mechanism. This shaft 24 is centered through a ball-bearing 25 in the gear housing and drives through splines or key means the hub 26 of a clutch 30' of which the bell housing 27 encloses an axially slidable piston 30 and supports clutch disks such as 28. This bell housing 27 is also adapted to carry along a sheet-metal member 34 supporting in turn the disks 35 of another clutch.

The pressure chamber 27' of the first clutch is fed with oil under pressure through a passage 32. Two packings 31 seal the joint between the hub 26 and the housing. The oil pressure applied to chamber 27', by moving the piston 36, causes the clutch disks 28 and 29 to be clamped against one another, the disks 29 of second set are mounted on a support 50 mounted in turn through splines on a shaft 51. A spring 33 returns the piston 30 to its clutch-releasing position when the oil pressure is relieved in chamber 27'. The sheet-metal member 34 carrying the other disks 35 may be rotatably connected to shaft 45 through the medium of another clutch 40' consisting of a bell housing 37 enclosing a piston 40 and supporting the disks 36, and of a hub 39 formed with a passage 42 for delivering oil under pressure to chamber 41, the joint between the housing partition 75 and hub 39 being sealed by a pair of packings 43. By delivering oil under pressure to chamber 41 the disks 35 and 36 are clamped against one another and thus the shaft 45 is driven from the input shaft 24 of the change-speed mechanism.

A spring 44 returns the piston 40 to its clutch-releasing position when the oil pressure is relieved. The bell housing 37 is also used as a brake drum adapted to be tightened by a band 38 responsive to a control cylinder (not shown). Shafts 51 and 45 carry pinions 52 and 49 respectively. Pinion 49 constitutes the sun gear of a first simple epicyclic gear train wherein the planet carrier 46 is rigid with a pinion 56 through the medium of shaft 55, as shown. A freewheel 76 mounted between the housing partition 75 and the planet carrier 46 prevents the latter from revolving in a direction opposite to the engine direction of rotation. Finally, the planet carrier 46 is solid with a brake drum 47 adapted to be held against rotation by tightening a brake band 48. The internally toothed annulus 53 of this first simple epicyclic gear train is secured on a flanged member 54 rigid with the planet carrier 54' of a second compound epicyclic gear train without outer annulus. This second train consists of the two sun gears 56 and 42 mentioned hereinabove. Sun gear 56 meshes with long planet gears such as 57 and these mesh in turn with planet wheels such as 58 meshing with sun gear 52. The planet carrier 54' constitutes the output member of the change-speed gear. This member carries a tubular shank 59 for driving a pinion meshing in turn with another pinion 68 fast with a shaft 69 carrying the driving pinion 70 in meshing engagement with the crown wheel 71 of the differential. A distance-piece 72 is provided for positioning the driving pinion 70. A pair of taper roller bearings 73, 74 center the shaft 69 and absorb the thrusts. The pinion 60 centered in the housing by means of a ball-bearing 64 drives an oil pump 61 consisting of internally toothed gears 62 and 63. The worm 65 is in meshing engagement with pinion 66 for driving the governor device and the speedometer. Finally, a nut 67 is provided for locking the pinion 60 and worm 65 on the tubular shank 59.

The following teeth numbers may be used for the different elements, for example:

| | Teeth |
|---|---|
| Sun gear 49 | 27 |
| Sun gear 56 | 24 |
| Annulus 53 | 57 |
| Sun gear 52 | 18 |
| Planet gears such as 57 | 15 |
| Planet gears such as 58 | 18 |

This assembly operates as follows:

The above-described transmission provides three forward speeds and reverse, and a neutral position.

1. *Neutral*

In this position the two rotary clutches 30' and 40' are disengaged and the two brake bands 38 and 48 are released. The engine drives the impeller 15 and, through the oil in the converter, the turbine or receiver 16 which does not transmit any torque to the change-speed gear (as the two input clutches 30' and 40' are disengaged as already set forth). It may be noted that the front pump 20' is driven from the impeller of the torque converter to deliver oil to the various hydraulic control circuits and notably to the torque converter itself.

2. *First or Low Speed*

The first or lowest speed is obtained by engaging the clutch 30'. Thus the engine torque is transmitted to the sun wheel 52. The sun gear 56 driven through planet gears such as 57 and 58 tends to revolve in a direction opposite to the engine direction of rotation. However, this movement is prevented by the freewheel 76 rigid with the sun gear 56 through the medium of the planet carrier 46.

The transmission will thus provide the first or lowest speed and with the teeth numbers given by way of example hereinabove the reduction ratio thus obtained is 2.3.

As the reaction in first speed is unidirectional, the engine cannot be used for braking purposes as desirable in some circumstances. However, this effect can be obtained by simply tightening the brake band 48 on drum 47 so that the planet carrier 46 is held against rotation in either direction.

3. *Second or Intermediate Speed*

The change to second or intermediate speed is obtained by releasing the brake 48 (if the latter was previously tightened) and tightening the other brake 38 on the relevant drum 37, so as to hold the sun gear 49 of the first simple epicyclic gear train against rotation. Clutch 30' remains engaged; in other words, the sun gear 52 continues to receive the engine torque.

When the drive occurred in first or low speed, the sun gear 49 revolved freely in a direction opposite to that of the engine as the planet carrier 53 was held against rotation. In second or intermediate speed, as the sun gear 49 is fixed the planet carrier 46 revolves in the engine direction of rotation and reacts through its planet wheels such as 46' on the sun gear 49, thus transmitting the reaction torque to the housing.

The reduction ratio thus obtained with the teeth numbers given hereinabove is 1.4.

4. *Third or Top Speed*

This is the direct drive. It is obtained by releasing the brake band 38 and engaging the second rotary clutch 40' so that the sun gears 49 and 52 are caused to revolve at the same speed, and therefore the whole train rotates at engine speed.

5. *Reverse*

Reverse is obtained by the engaging clutch 40' so as to cause the sun gear 49 to revolve as a unit with the engine shaft, and by tightening the brake band 48 so as to hold the planet carrier 47 against rotation. In this case the power is transmitted very simply through sun gear 49 driving through planet wheels such as 46' the internally toothed annulus 53 connected to the output member, this annulus revolving in the direction opposite to the engine direction of rotation. As the planet carrier tends to revolve in the same direction as the engine, the freewheel 76 remains inoperative and the reaction torque is absorbed by the brake band 48.

The reduction ratio obtained in this specific case with the above-mentioned teeth numbers is 2.1.

As a rule it will be noted that the output shaft 59 of the change-speed gear proper drives the driving pinion of the differential through the two pinions 60 and 68. The driving pinion or bevel gear 70 proper is mounted on the shaft 69 centered by a pair of taper roller bearings on either side of the differential housing. This is advantageous in that it permits of reducing the length of the change-speed gear as a result of the fact that the shaft of the driving pinion is centered in the change-speed gear housing proper.

The output shaft 59 also drives on the one hand the oil pump 61 which, when the vehicle has attained a predetermined speed, becomes operative and by-passes the front pump 20', and on the other hand the pinion 66 through the medium of worm 65. Pinion 66 drives on the one hand the tachometer device associated with the governor device of the change-speed gear, and on the other hand the speedometer proper.

FIG. 2 illustrates a modified embodiment of the change-speed gear described hereinabove. In this embodiment, the input shaft 124 is assumed to be driven like the shaft 24 of the previous embodiment and, in its turn, it drives the hub 122 of the clutch bell 127. A ball bearing 123 centers the shaft 124 in the gear housing. The bell housing 127 carries a support 126 for driving a set of clutch disks 128. This support 126 also carries a sheet-metal ring 134 constituting in turn a support and a driving member for another set of clutch disks 144. The clutch bell housing 127 receives a piston 130 consisting of two sheet-metal members welded together. The chamber 127' of clutch 136 is fed with oil under pressure through orifices 132 formed in the hub 122 and opening into the end space 125. A pair of packings 121 and 131 seal the end space 125 against oil leakages. The shaft 163 carries a hub 135 on which disks 129 are carried. The disks 129 and 128 may be clamped against one another by the piston 130 and in this case the shaft 124 becomes rotatably solid with shaft 163. A pair of dished or cup washers 133 act as return springs to the piston 130.

The clutch 137 consists of a hub 146 mounted through splines on shaft 154. The plate 140 of this clutch constitutes the support of a brake drum 138 adapted to be locked against rotation by a brake band 138'. This drum 138 is also used for supporting the clutch disks 139. The disks of sets 139 and 144 alternate with one another and may be clamped together by applying oil pressure to chamber 141 and thus move piston 142 to its clutch-engaging position. This chamber 141 is fed with oil under pressure through a hole 147 formed through the wall of hub 146 and opening into chamber 147'. This chamber 147' is adapted to be fed through the hole 148 formed in the support 151, the necessary oil-tightness being obtained by means of packings 149 and 149'. The piston 142 is sealed by means of packings such as 143 and returned to its clutch-releasing position by a pair of cup or dished spring washers 145.

The gear mechanism comprises two compound epicyclic gear trains without outer annulus, each train comprising two sun gears and a planet carrier carrying two sets of planet gears.

The planet carrier 158 of the first train is rotatably solid with a brake drum 156 adapted to be locked against rotation by a brake band 157. This planet carrier is centered in chamber 147' by a ball-bearing 150. A freewheel device 152 disposed between the aforesaid support 151 and the planet carrier 158 prevents the latter from rotating in a direction opposite to the engine rotation. Finally, this planet carrier is connected through splines 159 to a sun gear 160 of the second epicyclic train. The sun gear 155 of the first train is an integral part of, or solid with, shaft 154; the above-mentioned shaft 163 carries the sun gear 164 of the first train and the sun gear 165 of the second train, as shown.

The sun gear 155 of the first epicyclic gear train is in meshing engagement with long planet wheels such as 161. These mesh with planet wheels such as 162 meshing in turn with the sun gear 164.

The sun gear 160 of the second train is in meshing engagement with long planet wheels such as 160' meshing in turn with planet wheels such as 165 meshing themselves with the sun gear 165'. The planet carrier 166 of the second train is connected to the driving pinion of the differential through a pinion 168 mounted through splines on the extension 167 of the planet carrier and in meshing engagement with another pinion 169 mounted on a countershaft 170 carrying the driving pinion 171. A worm 172 mounted on the countershaft 170 drives an oil pump as well as the tachometer member of the governor device. A nut 172' clamps the ball-bearing 170' through the medium of the worm 172 and pinion 169 acting as distance-pieces. Finally, a worm 173 mounted on the inner end of countershaft 170 drives the speedometer.

The gear mechanism is lubricated as follows:

The oil under a pressure of about 25 to 30 p.s.i. is delivered to chamber 119. This chamber is sealed by a packing 121 and the oil flows therefrom through a passage 120 formed in shaft 124, then through orifices 175, 176 and 176' for lubricating the centering bushings of the concentric shafts.

The oil lubricates the pinion of the two epicyclic gear trains through a hole 175.

Finally, the following numbers of teeth may be used:

| | Teeth |
|---|---|
| Sun gear 155 | 27 |
| Sun gear 164 | 21 |
| Sun gear 165 | 21 |
| Sun gear 160 | 30 |
| Planet gears 160' | 15 |
| Planet gears 161 | 15 |
| Planet gears 162 | 21 |
| Planet gears 165' | 21 |

The operation of this transmission mechanism is similar to that of the mechanism shown in FIG. 1 and described hereinabove.

1. *Neutral*

The clutches and brakes are released, notably clutches 136 and 137. Thus, the turbine shaft 124 cannot drive the change-speed elements proper.

2. *Forward Drive—First or Low Speed*

As a rule, in forward drive conditions the clutch 136 is engaged. To this end, oil under pressure is fed to chamber 125 through orifice 132 and feeds similarly chamber 127'. The disks 128 and 129 are thus clamped by piston 130. The shaft 124 will thus drive shaft 163 through clutch 136. The planet carrier 166 is operatively connected to the output member of the change-speed mechanism; pinion 165 carried by shaft 163 drives the second epicyclic gear train; the sun gear 160 connected to the planet carrier 158 of this gear train tends to revolve in a direction opposite to the engine direction of rotation, but this movement is prevented by the freewheel device 152.

The planet carrier 166 is thus driven in the engine direction of rotation by pinion 165, the reaction torque being applied to sun gear 160. The reduction ratio thus obtained with the teeth numbers set forth hereinabove is 2.43.

The presence of the freewheel device eliminates the possibility of using the engine for braking or retarding purposes, but this action can nevertheless be obtained by holding the planet carrier 158 against movement, that is, by tightening the brake band 157 to by-pass the freewheel device.

3. *Second or Intermediate Speed*

The clutch 136 is left in its engaged position and the sun gear 155 of the first planetary gear train is locked by tightening the brake drum 140 by means of the brake band 138'. The sun gear 164 will thus drive the first train of which the second sun gear 155 is fixed. Thus, the planet carrier 158 is carried along in the direction of rotation corresponding to the forward drive at a speed inferior to that of the engine output member to drive the sun gear 160 of the second epicyclic gear train of which the other sun gear 165 is also driven from the engine output member. The planet carrier 166 operatively connected to the output shaft of the change-speed mechanism is thus driven with a 1.5 reduction ratio.

4. *Third or Top Speed*

In third speed the transmission revolves as a unit; to this end the brake band 138' is released and clutch 137 engaged by delivering oil under pressure to chamber 141 through duct 147, chamber 147' and duct 148. The engine shaft 124 will thus drive on the one hand the pinion 165 through clutch 136 and on the other hand the pinion 155 through clutch 137. Thus, since two elements revolve at engine speed, the output will also revolve at the speed of the input or driving member of the mechanism.

5. *Reverse*

In reverse the clutch 136 is disengaged and clutch 137 engaged. The pinion 155 of the epicyclic gear train is thus operatively connected to the engine output member. The brake band 157 is tightened to hold the planet carrier 158 of the first epicyclic gear train against rotation. Thus the sun gear 155 drives through planet gears 161 the sun gear 164 in the engine direction of rotation. The engine output member is rotatably connected to the sun gear 165 of the second epicyclic gear train, the second sun gear 160 of this train being connected to the planet carrier 158 of the first train.

The planet carrier 166 is thus driven in a direction opposite to the engine direction of rotation with a 1.9 reduction ratio with the teeth numbers given hereinabove.

Although the present invention has been described in conjunction with two preferred embodiments, it is to be understood that modifications and variations may be resorted to without departing form the spirit and scope of the invention, as those skilled in the art will readily understand. Such modifications and variations are considered to be within the purview and scope of the invention and appended claims.

I claim:

1. A transmission box for vehicles including an engine-transmission unit comprising a differential and, at the side of said differential opposite of the engine, a change-speed box having an outlet shaft and an input shaft inside the outlet shaft, said outlet shaft being drivingly connected to the differential, a first and a second clutch having a common input element and each an output element, a first and second epicyclic train each having a first, second and third element rotating about the axis of the train and interconnected by satellites, the input element of said clutches being connected at the free end of the input shaft that traverses axially the said epicyclic trains, the output element of the first clutch comprising a shaft surrounding the said input shaft and carrying the first element of the first epicyclic train forming a sun gear, the outlet shaft of the second clutch comprising a shaft surrounding the said output shaft of the first clutch and carrying the first element of the second epicyclic train forming a sun gear, the second element of the first train forming a satellite support being connected for rotation to the outlet shaft and carrying two satellite groups meshing with each other, one of said groups meshing with the first element of said epicyclic train and the other groups meshing with the third element of said train which is connected for rotation to the second element of the second epicyclic train forming a satellite support, the third element of the second epicyclic train being connected for rotation to an element of the first epicyclic train other than the said third element of said train, a first brake cooperating with the satellite support of the second epicyclic train and a second brake cooperating with the output element of the second clutch, said brakes and clutches being selectively operable for obtaining a transmission comprising a plurality of speeds and a reverse speed.

2. Transmission box according to claim 1, in which a unidirectional coupling is interposed between the satellite support of the second epicyclic train and a stationary part of the box, so as to permanently prevent rotation of said satellite support in a direction opposite of the direction of rotation of the input shaft.

3. Transmission box according to claim 1, in which the satellite support of the second epicyclic train comprises a single group of satellites, the third element of said train being a toothed annulus connected for rotation with the satellite support of the first epicycle train.

4. Transmission box according to claim 1, in which the satellite support of the second epicyclic comprises two groups of satellites meshing with each other, one of said groups meshing with said first element of said train, the other group meshing with the third element of said train forming a planetary connected for rotation with said first element of the first epicyclic train.

References Cited in the file of this patent

UNITED STATES PATENTS

| | | |
|---|---|---|
| 2,123,769 | Cotal | July 12, 1938 |
| 2,454,014 | Seybold | Nov. 16, 1948 |
| 2,693,721 | Forster | Nov. 9, 1954 |
| 2,725,762 | Hettinger et al. | Dec. 6, 1955 |
| 2,860,526 | Dodge | Nov. 18, 1958 |
| 2,892,365 | Winther | June 30, 1959 |
| 2,893,266 | Kelley | July 7, 1959 |
| 3,025,721 | De Lorean | Mar. 20, 1962 |

FOREIGN PATENTS

| | | |
|---|---|---|
| 630,508 | Great Britain | Oct. 14, 1949 |
| 1,054,853 | Germany | Apr. 9, 1959 |